US012645581B2

(12) United States Patent
Brewer et al.

(10) Patent No.: US 12,645,581 B2
(45) Date of Patent: *\*Jun. 2, 2026*

(54) SYNCHRONIZED REQUEST HANDLING AT A MEMORY DEVICE

(71) Applicant: Micron Technology, Inc., Boise, ID (US)

(72) Inventors: Tony M. Brewer, Plano, TX (US); Dean E. Walker, Allen, TX (US)

(73) Assignee: Micron Technology, Inc., Boise, ID (US)

( \* ) Notice: Subject to any disclaimer, the term of this patent is extended or adjusted under 35 U.S.C. 154(b) by 0 days.

This patent is subject to a terminal disclaimer.

(21) Appl. No.: 18/887,886

(22) Filed: Sep. 17, 2024

(65) Prior Publication Data

US 2025/0013562 A1 Jan. 9, 2025

Related U.S. Application Data

(63) Continuation of application No. 17/899,197, filed on Aug. 30, 2022, now Pat. No. 12,111,758.

(51) Int. Cl.
*G06F 12/02* (2006.01)
*G06F 12/0831* (2016.01)
*G06F 12/0893* (2016.01)

(52) U.S. Cl.
CPC ...... *G06F 12/0238* (2013.01); *G06F 12/0833* (2013.01); *G06F 12/0893* (2013.01)

(58) Field of Classification Search
CPC ............. G06F 12/0238; G06F 12/0833; G06F 12/0844; G06F 12/0857; G06F 12/0864; G06F 12/0875; G06F 12/0893; G06F 12/0895; G06F 2212/1008; G06F 2212/1024

See application file for complete search history.

(56) References Cited

U.S. PATENT DOCUMENTS

| | | | |
|---|---|---|---|
| 7,293,161 B1 | 11/2007 | Chaudhry et al. | |
| 2005/0088970 A1 | 4/2005 | Schmidt et al. | |
| 2005/0251668 A1 | 11/2005 | Chaudhry et al. | |
| 2014/0036695 A1* | 2/2014 | Ziegler ................. | H04L 49/901 370/252 |
| 2014/0075124 A1 | 3/2014 | Blundell et al. | |
| 2024/0070060 A1 | 2/2024 | Brewer et al. | |

FOREIGN PATENT DOCUMENTS

CN 117632788 A 3/2024

\* cited by examiner

*Primary Examiner* — Aracelis Ruiz
(74) *Attorney, Agent, or Firm* — Schwegman Lundberg & Woessner, P.A.

(57) ABSTRACT

System and techniques for synchronized request handling at a memory device are described herein. A request is received at the memory device. Here, the request indicates a memory address corresponding to a set of cache lines and a single cache line in the set of cache lines. The memory device maintains a deferred list for the set of cache lines and a set of lists with each member of the set of lists corresponding to one cache line in the set of cache lines. The memory device tests the deferred list to determine that the deferred list is not empty and places the request in the deferred list.

20 Claims, 9 Drawing Sheets

_—400_

| | | | |
|---|---|---|---|
| 405 — | CACHE SET 0 (ADDRESS 00XXXX) | CACHE LINE | WAY 0 TAG + DATA |
| | | CACHE LINE | WAY 1 TAG + DATA |
| | | CACHE LINE | WAY 2 TAG + DATA |
| | | CACHE LINE | WAY 3 TAG + DATA |
| 410 — | CACHE SET 1 (ADDRESS 01XXXX) | CACHE LINE | WAY 0 TAG + DATA |
| | | CACHE LINE | WAY 1 TAG + DATA |
| | | CACHE LINE | WAY 2 TAG + DATA |
| | | CACHE LINE | WAY 3 TAG + DATA |
| 415 — | CACHE SET 2 (ADDRESS 10XXXX) | CACHE LINE | WAY 0 TAG + DATA |
| | | CACHE LINE | WAY 1 TAG + DATA |
| | | CACHE LINE | WAY 2 TAG + DATA |
| | | CACHE LINE | WAY 3 TAG + DATA |
| 420 — | CACHE SET 3 (ADDRESS 11XXXX) | CACHE LINE | WAY 0 TAG + DATA |
| | | CACHE LINE | WAY 1 TAG + DATA |
| | | CACHE LINE | WAY 2 TAG + DATA |
| | | CACHE LINE | WAY 3 TAG + DATA |

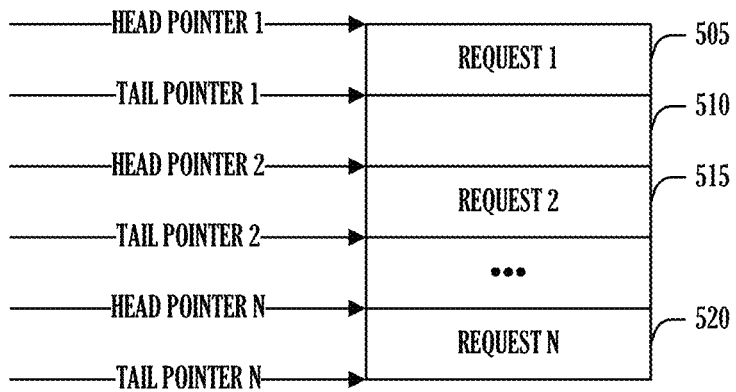
FIG. 5

—600
605 —
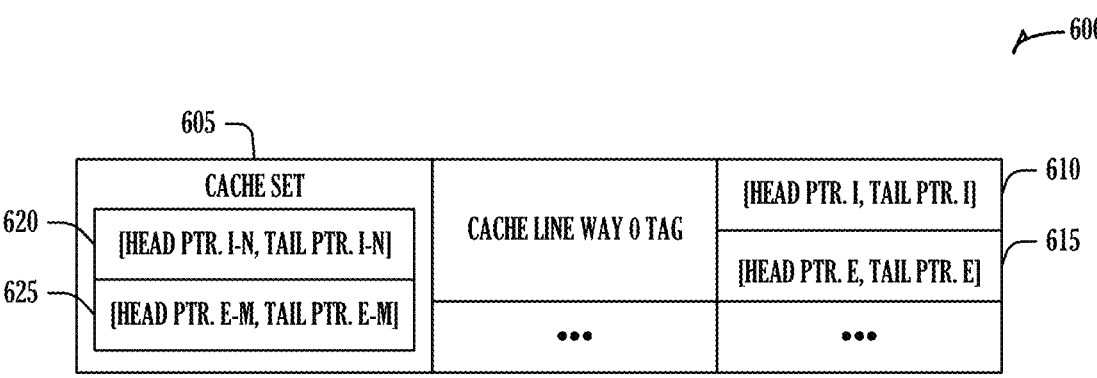
INTERNAL
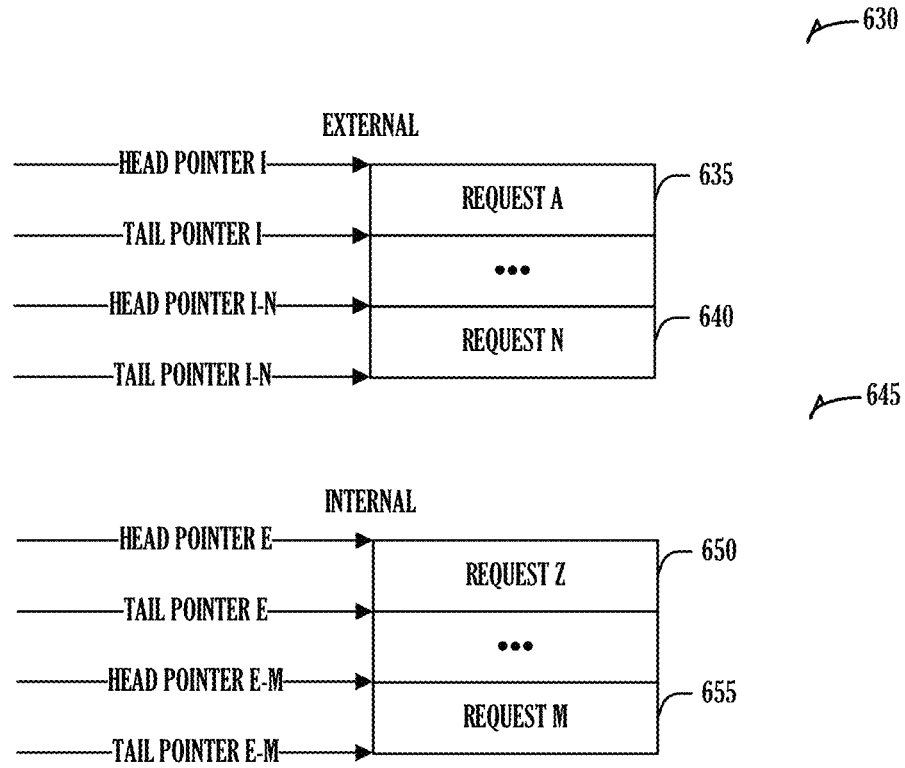
FIG. 6

800

805 — RECEIVE MEMORY OPERATION FOR CACHE WAY

810 — DETERMINE WHETHER THE DEFERRED LIST FOR THE CACHE SET THAT INCLUDES THE WAY IS EMPTY

815 — PLACE THE MEMORY REQUEST IN THE WAY LIST BASED ON THE DEFERRED LIST BEING EMPTY AND PLACE THE MEMORY REQUEST IN THE DEFERRED LIST OTHERWISE

SYNCHRONIZED REQUEST HANDLING AT A MEMORY DEVICE

PRIORITY APPLICATION

This application is a continuation of U.S. application Ser. No. 17/899,197, filed Aug. 30, 2022, which is incorporated herein by reference in its entirety.

STATEMENT REGARDING GOVERNMENT SUPPORT

This application is a continuation of U.S. application Ser. No. 17/899,197, filed Aug. 30, 2022, now U.S. Pat. No. 12,111,758, which is incorporated herein by reference in its entirety.

TECHNICAL FIELD

Embodiments described herein generally relate to computer memory and more specifically to synchronized request handling at a memory device.

BACKGROUND

Memory devices for computers or other electronic devices can be categorized as volatile and non-volatile memory. Volatile memory uses power to maintain its data (e.g., is periodically refreshed), and includes random-access memory (RAM), dynamic random-access memory (DRAM), or synchronous dynamic random-access memory (SDRAM), among others. Non-volatile memory generally retains stored data in the absence of a power source, and includes flash memory, read-only memory (ROM), electrically erasable programmable ROM (EEPROM), static RAM (SRAM), erasable programmable ROM (EPROM), resistance variable memory, phase-change memory, storage class memory, resistive random-access memory (RRAM), and magnetoresistive random-access memory (MRAM), among others. Persistent memory is an architectural property of the system where the data stored in the media is available after system reset or power-cycling. In an example, non-volatile memory media can be used to build a system with a persistent memory model.

Memory devices can be coupled to a host (e.g., a host computing device) to store data, commands, or instructions for use by the host while the computer or electronic system is operating. For example, data, commands, or instructions can be transferred between the host and the memory device during operation of a computing or other electronic system.

Various protocols or standards can be applied to facilitate communication between a host and one or more other devices such as memory buffers, accelerators, or other input/output devices. In an example, an unordered protocol, such as Compute Express Link (CXL), can be used to provide high-bandwidth and low-latency connectivity.

BRIEF DESCRIPTION OF THE DRAWINGS

In the drawings, which are not necessarily drawn to scale, like numerals can describe similar components in different views. Like numerals having different letter suffixes can represent different instances of similar components. The drawings illustrate generally, by way of example, but not by way of limitation, various embodiments discussed in the present document.

FIG. 4 illustrates an example of an associative cache, according to an embodiment.

FIG. 5 illustrates an example of a memory including several cache way defer queues and cache tags pointing to the defer queues, according to an embodiment.

FIG. 6 illustrates an example of a cache set reference to cache-set defer queues divided by which interface requests were received, according to an embodiment.

DETAILED DESCRIPTION

Figure 1:
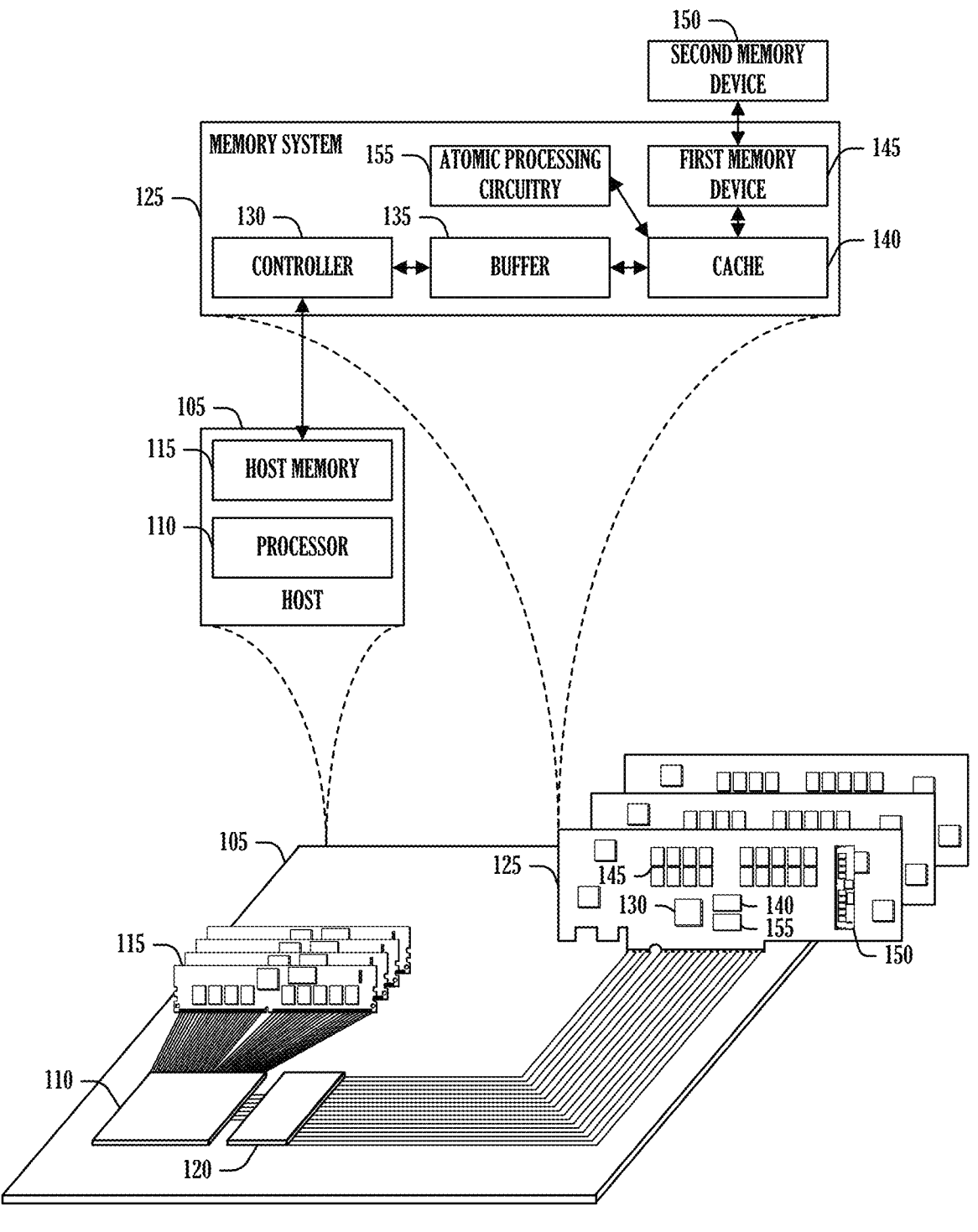
FIG. 1 illustrates an example of an environment including a system for synchronized request handling at a memory device, according to an embodiment.

Compute Express Link (CXL) is an open standard interconnect configured for high-bandwidth, low-latency connectivity between host devices and other devices such as accelerators, memory buffers, or smart input-output (I/O) devices. CXL was designed to facilitate high-performance computational workloads by supporting heterogeneous processing and memory systems. CXL provides memory semantics and mechanisms for cache coherency on top of PCI Express (PCIe)-based I/O semantics for optimized performance.

CXL can be used in applications such as artificial intelligence, machine learning, analytics, cloud infrastructure, edge computing devices, communication systems, and elsewhere, to provide flexible connectivity to memory or accelerators for a host processor platform. Data processing in such applications can use various scalar, vector, matrix, or spatial architectures that can be deployed in CPU, GPU, FPGA, smart NICs, or other accelerators that can be coupled using a CXL link. Near memory accelerators, in which an accelerator is collocated with memory, provide low latency processing while expanding system capabilities.

CXL supports dynamic multiplexing using a set of protocols that includes I/O (CXL.io, based on PCIe), caching (CXL.cache), and memory (CXL.memory) semantics. In an example, CXL can be used to maintain a unified, coherent memory space (e.g., cache coherence) between the CPU (e.g., a host device or host processor) and any memory managed (e.g., at) the CXL device. This configuration enables the CPU and other device to share resources and operate on the same memory region for higher performance, reduced data-movement, and reduced software stack complexity. In an example, the CPU is primarily responsible for maintaining or managing coherency in a CXL environment. Accordingly, CXL can be leveraged to help reduce device cost and complexity, as well as overhead traditionally associated with coherency across an I/O link.

CXL devices that include both memory and an accelerator can be termed "CXL type-2" devices. Although the accelerators of such devices can be used by themselves through the CXL interface, often these accelerators provide near-memory compute to reduce round-trip latency to a host processor. In accordance with current CXL standards, CXL memory requests (e.g., external requests) take priority over other requests, such as network-on-chip (NOC) or other internal requests. This priority requires CXL memory requests to make forward progress independent of any other device activity, such as activity by an accelerator. That is, a CXL memory request cannot block indefinitely waiting for a non-CXL memory request to complete. Separately managing memory controller workflow with this restriction when both CXL and non-CXL requests are being made can be a complex process.

To address the complexity between CXL (or other external) requests and accelerator (or other internal requests), separate processing queues are maintained for deferred requests. Requests that are not deferred proceed as soon as they arrive in the memory controller because there is no resource contention. Thus, in these cases, there is no opportunity, for example, for an internal request to block the progress of an external request. However, when resource contention is present, the request will be deferred until the contention is resolved. An elegant solution to managing the different processing priorities of external and internal requests includes queuing each in separate deferral queues, whereby priority of the external requests can be easily maintained by prioritizing extraction of requests from the external queue. Moreover, order of operations on a memory address can be maintained by judicious selection of requests from the external and internal queues all while preventing an internal request from blocking (e.g., preventing forward progress on) an external request.

It is generally important to maintain ordering of requests, such as read versus write requests, for data integrity or proper program execution in some CXL device accelerators. As noted herein, lists for cache ways and a cache set are used to hold deferred requests. By controlling into which lists, or queues, requests are placed, correct request process ordering can be ensured. For example, if a request for a specific memory way is in a set deferred request list (e.g., a general cache set queue or general deferred queue), then all future requests for that way can be pushed into the deferred request list. Similarly, if a request for a memory way is in a way deferred request list (e.g., queue specific to cache line or cache way), then all future requests for that way can be pushed into the deferred request list. A variety of other conditional queueing scenarios are provided below. In an example, the conditions are ascertained from cache tag state for a hit in the cache. Using the devices and following the techniques described herein can ensure in-order processing of requests for a memory line in the presence of evicted pending recall states, or other memory line state conditions. Additional details and examples are provided below.

FIG. 1 illustrates an example of an environment including a system for synchronized request handling at a memory device, according to an embodiment. The system includes a host device 105 and a memory system 125. The host device 105 includes processor 110 (e.g., a central processing unit (CPU)) and host memory 115. In an example, the host device 105 is, or is part of, a host system such as a server computer, workstation, personal laptop computer, a desktop computer, a digital camera, a smart phone, a memory card reader, or Internet-of-thing enabled device, among others. The processor 110 can include one or more processor cores, a system of parallel processors, or other CPU arrangements.

The memory system 125 includes a controller 130, a buffer 135 (e.g., internal state memory), a cache 140, and a first memory device 145. The first memory device 145 can include, for example, one or more memory modules (e.g., single in-line memory modules, dual in-line memory modules, etc.). The first memory device 145 can include volatile memory or non-volatile memory. The first memory device 145 can include a multiple-chip device that comprises one or multiple different memory types or modules. In an example, the system includes a second memory device 150 that interfaces with the memory system 125 and the host device 105.

The host device 105 can include a system backplane and can include a number of processing resources (e.g., one or more processors, microprocessors, or some other type of controlling circuitry). The system can optionally include separate integrated circuits for the host device 105, the memory system 125, the controller 130, the buffer 135, the cache 140, the first memory device 145, the second memory device 150, any one or more of which can comprise respective chiplets that can be connected and used together. In an example, the system includes a server system or a high-performance computing (HPC) system or a portion thereof. Embodiments of the host device 105 can be implemented in Von Neumann or in non-Von Neumann architectures, which can include one or more components (e.g., CPU, ALU, etc.) often associated with a Von Neumann architecture, or can omit these components.

In an example, the first memory device 145 can provide a main memory for the system, or the first memory device 145 can comprise accessory memory or storage for use by the system. In an example, the first memory device 145 or the second memory device 150 includes one or more arrays of memory cells, e.g., volatile or non-volatile memory cells. The arrays can be flash arrays with a NAND architecture, for example. Embodiments are not limited to a particular type of memory device. For instance, the memory devices can include RAM, ROM, DRAM, SDRAM, PCRAM, RRAM, and flash memory, among others.

In embodiments in which the first memory device 145 includes persistent or non-volatile memory, the first memory device 145 can include a flash memory device such as a NAND or NOR flash memory device. The first memory device 145 can include other non-volatile memory devices such as non-volatile random-access memory devices (e.g., NVRAM, ReRAM, FeRAM, MRAM, PCM). Some memory devices—such as a ferroelectric RAM (FeRAM) devices that include ferroelectric capacitors—can exhibit hysteresis characteristics, such as a 3-D Crosspoint (3D XP) memory device, or combinations thereof.

In an example, the interface 120 can include any type of communication path, bus, interconnect, or the like, that enables information to be transferred between the processor 110, or other devices of the host device 105, and the memory system 125. Non-limiting examples of interfaces can include a peripheral component interconnect (PCI) interface, a peripheral component interconnect express (PCIe) interface, a serial advanced technology attachment (SATA) interface, a Universal Serial Bus (USB) interface, a Thunderbolt interface, or a miniature serial advanced technology attachment (mSATA) interface, among others. In an example, the interface 120 includes a PCIe 5.0 interface that is compliant with the compute express link (CXL) protocol standard. Accordingly, in some embodiments, the interface 120 supports transfer speeds of at least 32 GT/s.

CXL is a high-speed central processing unit (CPU)-to-device and CPU-to-memory interconnect designed to enhance compute performance. CXL maintains memory coherency between the CPU memory space (e.g., the host memory 115 or caches maintained by the processor 110) and memory on attached devices or accelerators (e.g., the first memory device 145 or the second memory device 150). This arrangement enables resource sharing at higher perfor- mance, reduced software stack complexity, and lower over- all system cost than other interconnect arrangements. CXL is an industry open standard interface for high-speed com- munications to accelerators that are increasingly used to complement CPUs in support of emerging data-rich and compute-intensive applications such as artificial intelligence and machine learning. The memory system 125 is illustrated with atomic processing circuitry 155 as an accelerator in order to perform near-memory operations. In general, the atomic memory operations (AMOs) performed by the atomic processing circuitry 155 include such small opera- tions as incrementing a number at a memory address or multiply number in two memory addresses, etc. While AMOs are generally used for such operations, the manipu- lation of memory is not so restricted. For example, modern artificial neural network architectures generally involves the application of small additive or multiplicative operations or thresholding across vast swaths of artificial neurons. Because the computations are usually simple, but the data large, near memory execution of such operations is possible and beneficial given the illustrated architecture.

In an example, the controller 130 comprises a media controller such as a non-volatile memory express (NVMe) controller. The controller 130 can be configured to perform operations such as copy, write, read, error correct, etc. for the first memory device 145. In an example, the controller 130 can include purpose-built circuitry or instructions to perform various operations. That is, in some embodiments, the controller 130 can include circuitry or can be configured to perform instructions to control movement of data or addresses associated with data such as among the buffer 135, the cache 140, or the first memory device 145 or the second memory device 150.

In an example, at least one of the processor 110 or the controller 130 comprises a command manager (CM) for the memory system 125. The CM can receive, such as from the host device 105, a read command for a particular logic row address in the first memory device 145 or the second memory device 150. In an example, the CM can determine that the logical row address is associated with a first row based at least in part on a pointer stored in a register of the controller 130. In an example, the CM can receive, from the host device 105, a write command for a logical row address, and the write command can be associated with second data. In an example, the CM can be configured to issue, to non-volatile memory and between issuing the read com- mand and the write command, an access command associ- ated with the first memory device 145 or the second memory device 150. In an example, the CM can issue, to the non-volatile memory and between issuing the read com- mand and the write command, an access command associ- ated with the first memory device 145 or the second memory device 150.

In an example, the buffer 135 comprises a data buffer circuit that includes a region of a physical memory used to temporarily store data, for example, while the data is moved from one place to another. The buffer 135 can include a first-in, first-out (FIFO) queue in which the oldest (e.g., the first-in) data is processed first. In some embodiments, the buffer 135 includes a hardware shift register, a circular buffer, or a list.

In an example, the cache 140 comprises a region of a physical memory used to temporarily store particular data from the first memory device 145 or the second memory device 150. Generally, the cache provides faster access to data than the backing memories. The cache 140 can include a pool of data entries. In an example, the cache 140 can be configured to operate according to a write-back policy in which data is written to the cache without the being con- currently written to the first memory device 145. Accord- ingly, in some embodiments, data written to the cache 140 does not have a corresponding data entry in the first memory device 145. This can occur when, for example, data is written to the cache and deleted before a write-back is triggered to write the data into the first memory device 145, for example.

In an example, the cache 140 is implemented as a multi- way associative cache. Here, cache entries are divided by some portion of a memory address (e.g., a set number of significant bits). A group of cache entries (e.g., cache lines or ways), called a cache set herein, can be co-associated with a same bit-set from the memory address. Usually, the number of ways in a cache set is less than the total number of memory addresses to which the ways are associated. Thus, a way can be evicted to be associated with a new memory address in the range at various points. FIG. 4 illustrates some elements of this type of associate cache.

In an example, the controller 130 can receive write requests involving the cache 140 and cause data associated with each of the write requests to be written to the cache 140. The controller 130 can similarly receive read requests and cause data that is stored in, for example, the first memory device 145 or the second memory device 150, to be retrieved and written to, for example, the host device 105 via the interface 120. In an example, the controller 130 processes all requests for memory it controls through the cache 140. Thus, a read request will first check the cache 140 to determine if the data is already cached. If not, a read to the first memory device 145 is made to retrieve the data. The data is then written to the cache 140. In an example, the data is then read from the cache 140 and transmitted to the processor 110. Working exclusively through the cache can simplify some elements of the controller 130 hardware at the cost of a little latency.

The following operations are described as implemented by the controller 130 for the sake of simplicity. However, the cache 140 can include circuitry to perform some or all of these operations. The controller 130 is configured to priori- tize external (e.g., host requests, CXL memory requests, etc.) over internal requests (e.g., accelerator requests) via a queueing system that differentiates between the two types of requests. Specifically, the controller 130 is configured to maintain separate external request queues and internal request queues. Prioritization is given to the external request queue without complicated operation analysis or priority logic. FIG. 3 through FIG. 6 illustrate various aspects of this multi queue system. In short, when a request is received, a determination is made as to whether the address in the request maps to a current way of a cache set. Because a cache set represents a range of address well beyond the number of ways, it is possible that the memory address of the request does not map to a current way. If the request maps to a current way, and the way is not busy, then the request is executed. If the way is busy, the request is placed into one of two a cache way queues for that way; either the cache way external queue if the request is an external request or the cache way internal queue if the request is an internal request. As the way becomes free (e.g., not busy because a previous request completes), a next request from the cache way queue is popped to execute on the way. Generally, the cache way external queue is emptied before a next request from the cache way internal queue is popped, thus ensuring that no internal request blocks forward progress of the external requests.

If there is no current way that matches the request, then the request is placed in the cache set external queue or the cache set internal queue depending on whether the request is an external request or an internal request. Usually, once a way is free (e.g., not busy and with empty cache way queues), the way can be evicted and a next request from the cache set queue—again, usually the cache set external queue first—popped. The memory line corresponding to the newly popped request is loaded into a way and the request can execute. In this manner, proper execution order and blocking given the priority of external requests over internal requests can be maintained.

A situation can arise, however, in which a new request can be executed out of order. Specifically, if a current way matches the request and is not currently busy, but either the cache way queues are not empty or the cache set queues are not empty. Because requests in any of these queues represent previously arrived and deferred requests, the deferred requests should execute first. To implement this ordering, the controller 130 is configured to receive a request that indicates (e.g., includes) a memory address corresponding to a single cache way (e.g., line) in a cache set. Once the request is received, the controller 130 is configured to check the cache set queue (e.g., deferred list) corresponding to the request type (e.g., internal or external) to determine whether the cache set queue is empty or not. When the cache set queue is not empty, the controller 130 is configured to place the request into the cache set queue. Note that the placement of the request into the cache set queue occurs without regard to whether there is a current way that maps to the memory address or whether the way is busy. As long as the cache set queue of the appropriate type is not empty, the request is placed in that cache set queue.

If the appropriate cache set queue is empty, however, assuming that the memory request maps to a current way as noted above, then the appropriate cache way queue is checked to determine whether it is empty. If not, then the controller 130 is configured to place the request in the cache way queue. Consider, the controller 130 receives a second request indicating a second memory address corresponding to the cache set and a second single cache line in the cache set. In this example, when the controller 130 tests the cache set queue, the cache set queue is empty. In response to the determination that the cache set queue is empty, the cache way queue (e.g., a member of the set of lists that corresponds to the second single cache line) is evaluated to determine whether the cache way queue is empty. In an example, in response to the member of the set of lists not being empty, the second request is placed in the member of the set of lists. Here, regardless of whether the way is busy, the request is enqueued to ensure correct execution order of requests waiting on the way.

In an example, when the appropriate cache way queue is empty, the controller 130 is configured to check whether the way is busy. In an example, the controller 130 is configured to check the busy status of the way by reading the tag state of the way. In an example, in response to the second cache line being busy, the controller 130 is configured to place the request in the cache way external queue or cache way internal queue depending on the type of request. In an example, in response to the second single cache line not being busy, the controller 130 is configured to immediately execute the request.

Figure 2:
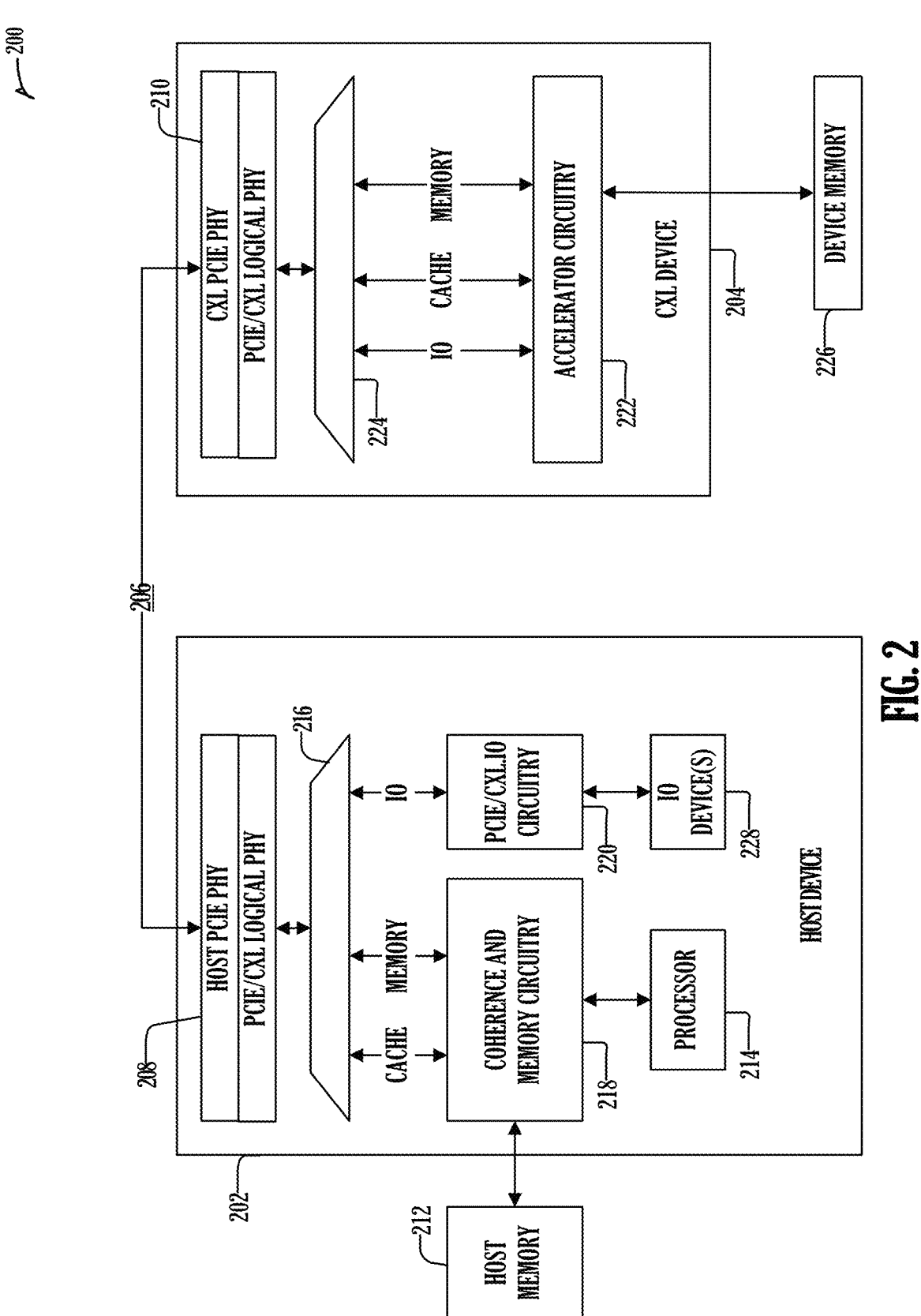
FIG. 2 illustrates an example of a host connected to a CXL device, according to an embodiment.

FIG. 2 illustrates an example of a host connected to a CXL device, according to an embodiment. FIG. 2 illustrates generally an example of a CXL system 200 that uses a CXL link 206 to connect a host device 202 and a CXL device 204 via a host physical layer PCIE interface 208 and a CXL client physical layer PCIE interface 210 respectively. In an example, the host device 202 comprises or corresponds to the host device 105 and the CXL device 204 comprises or corresponds to the memory system 125 from the example of the system in FIG. 1. A memory system command manager can comprise a portion of the host device 202 or the CXL device 204. In an example, the CXL link 206 can support communications using multiplexed protocols for caching (e.g., CXL.cache), memory accesses (e.g., CXL.mem), and data input/output transactions (e.g., CXL.io). CXL.io can include a protocol based on PCIe that is used for functions such as device discovery, configuration, initialization, I/O virtualization, and direct memory access (DMA) using non-coherent load-store, producer-consumer semantics. CXL.cache can enable a device to cache data from the host memory (e.g., from the host memory 212) using a request and response protocol. CXL.memory can enable the host device 202 to use memory attached to the CXL device 204, for example, in or using a virtualized memory space. In an example, CXL.memory transactions can be memory load and store operations that run downstream from or outside of the host device 202.

In the example of FIG. 2, the host device 202 includes a host processor 214 (e.g., comprising one or more CPUs or cores) and IO device(s) 228. The host device 202 can comprise, or can be coupled to, host memory 212. The host device 202 can include various circuitry (e.g., logic) configured to facilitate CXL-based communications and transactions with the CXL device 204. For example, the host device 202 can include coherence and memory circuitry 218 configured to implement transactions according to CXL.cache and CXL.mem semantics, and the host device 202 can include PCIe circuitry 220 configured to implement transactions according to CXL.io semantics. In an example, the host device 202 can be configured to manage coherency of data cached at the CXL device 204 using, e.g., its coherence and memory circuitry 218.

The host device 202 can further include a host multiplexer 216 configured to modulate communications over the CXL link 206 (e.g., using the PCIe PHY layer). The multiplexing of protocols ensures that latency-sensitive protocols (e.g., CXL.cache and CXL.memory) have the same or similar latency as a native processor-to-processor link. In an example, CXL defines an upper bound on response times for latency-sensitive protocols to help ensure that device performance is not adversely impacted by variation in latency between different devices implementing coherency and memory semantics.

In an example, symmetric cache coherency protocols can be difficult to implement between host processors because different architectures can use different solutions, which in turn can compromise backward compatibility. CXL can address this problem by consolidating the coherency function at the host device 202, such as using the coherence and memory circuitry 218.

The CXL device 204 can include an accelerator device that comprises various accelerator circuitry 222. In an example, the CXL device 204 can comprise, or can be coupled to, CXL device memory 226. The CXL device 204 can include various circuitry configured to facilitate CXL-based communications and transactions with the host device 202 using the CXL link 206. For example, the accelerator circuitry 222 can be configured to implement transactions according to CXL.cache, CXL.mem, and CXL.io semantics. The CXL device 204 can include a CXL device multiplexer 224 configured to control communications over the CXL link 206. The accelerator circuitry 222 can be one or more processors that can perform one or more tasks. Accelerator circuitry 222 can be a general purpose processor or a processor designed to accelerate one or more specific workloads.

Figure 3:
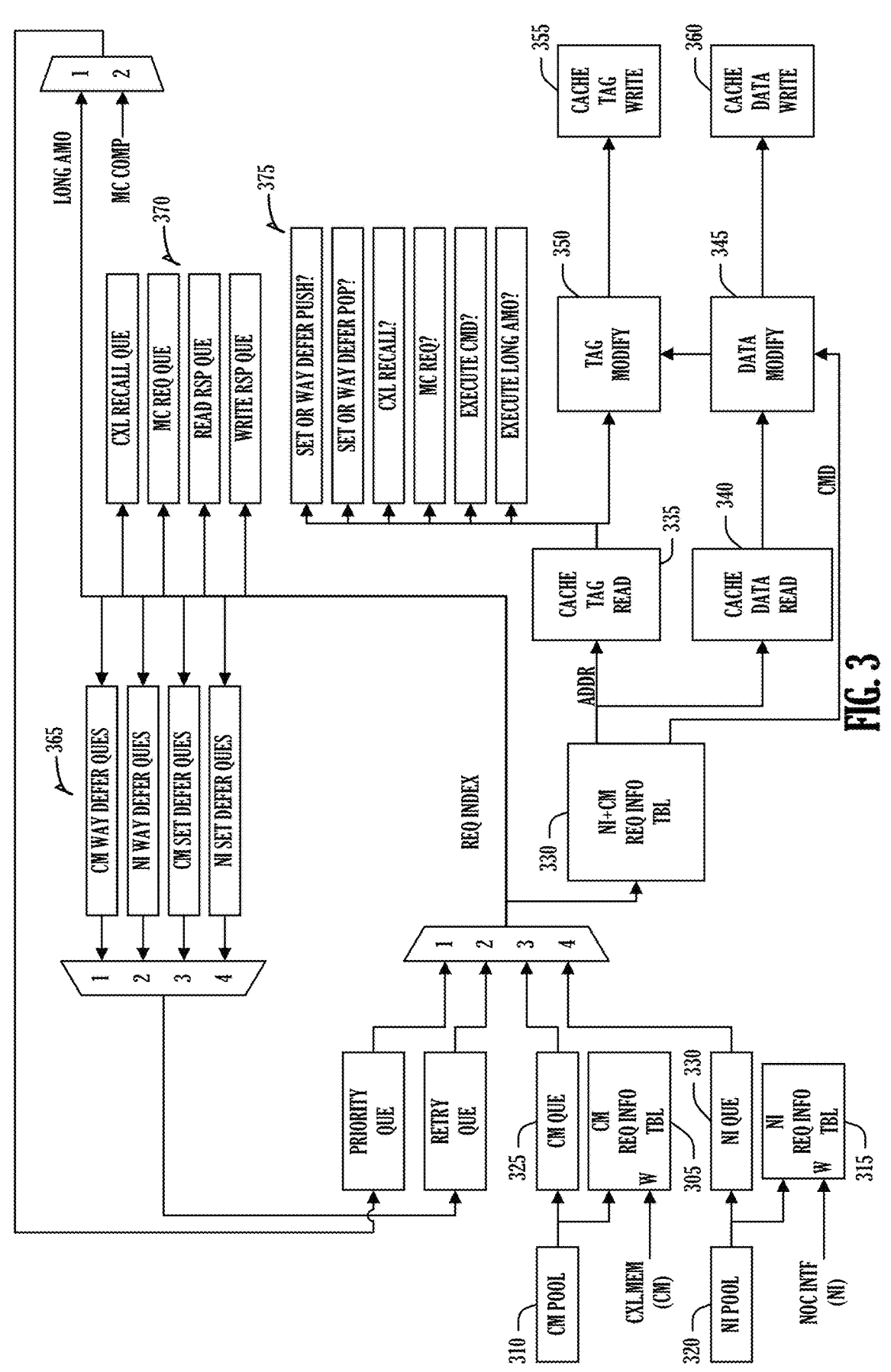
FIG. 3 illustrates example components of a memory device, according to an embodiment.

FIG. 3 illustrates example components of a memory device, according to an embodiment. The illustrated components are part of a memory controller, such as those described above (e.g., the memory controller 130 illustrated in FIG. 1) implementing a memory-side cache (MSC). The illustrated components include elements to address internal (e.g., from a near-memory accelerator) and external (e.g., received from a host via a CXL link) request differences used to maintain CXL protocol requirements, such as maintaining forward progress of CXL memory (CM) requests.

As illustrated, CM refers to CXL memory or other external requests and NI refers to requests coming from a NOC interface or other internal requests. Requests from CXL.mem are written to the CM Request Information Table 305. The entry in the CM Request Information Table 305 to which a request is written is obtained from the CM Request Information Table Pool 310. The CM Request Information Table Pool 310 maintains a list of indices to CM Request Information Table entries that are available (e.g., free, or unused). Requests from an accelerator within the device are written to the NI Request Information Table 315 using the NI Request Information Table Pool 320 for the available entry indices. The two pools—the CM Request Information Table Pool 310 and the NI Request Information Table Pool 320—are configured such that accelerator requests (e.g., internal requests) cannot consume all table entries. Thus, for example, if an additional NI request arrives and there is no free entry indicated in the NI Request Information Table Pool 320, the request fails.

CXL.mem requests from the CM queue 325 are selected at higher priority than NI requests in the NI queue 330 to ensure forward progress of the CM requests. In an example, as illustrated, when a request is selected from either the CM queue 325 or the NI queue 330, the request information is written into the NI+CM Request Information Table 325. Hereafter, each request is represented in the carious queues by an identifier (e.g., index) to an entry of the NI+CM Request Information Table 330. This arrangement can reduce the storage requirements and bandwidth in transferring the request information among the various queues at different processing points in the controller. When an aspect of the request is needed by a processing point, such as an address for a read, the identifier is used to reference the entry in the NI+CM Request Information Table 330 and retrieve the field of the request corresponding to the needed aspect. As with the CM Request Information Table 305 and the NI Request Information Table 315, a free list, or pool, of entries can be used to quickly determine which entries are available to store request information in the NI+CM Request Information Table 330.

When a request is selected, a cache tag 335 for a cache line (e.g., cache way) corresponding to an address in the request is checked to determine whether the requests will be deferred (e.g., processed later). Deferral of the request is generally required when there is no free way line entry in a cache set for the address in the request. If no deferral will occur, the cache data can be read 340 or modified 345 (e.g., for a write), and the way tag can be modified 350. Modifying the tag 350 or the cache data 345 can respectively be written to backing memory, such as in writing the tag data 355 and the cache way data 360.

When the request is deferred, the request the request entry identifier (e.g., from the NI+CM Request Information Table 330) is pushed to either the CM or NI defer queues 365. The way defer queues 365 are used when there is a way corresponding to the address in the request but the way is busy (e.g., waiting for another command to complete). The set defer queues 365 are used when there is no way that corresponds to the address. The request remains queued until a way is available (e.g., not busy). In an example, there are separate CM and NI defer queues 365 for each cache set within the cache.

The external control queues 370 manage external responses to the cache, such as responses to reads or writes to the backing memory, memory controller (MC) requests, or CXL recalls. A CXL recall is a request by the memory device to regain control of a cache way from the host. The recall is requested of the host and the host communicates the control of the cache way to the memory controller, for example, in CXL meta state. This procedure can be called a bias flip as the control bias for the cache way is flipped from the host to the controller or vice versa. This technique is used to enable cache coherency between any host cache and the memory device.

The command queues 375 track requests through a variety of processing points, such as whether to push or pop requests from defer queues 365, whether a CXL recall is initiated, memory controller requests, executing a command, or executing an atomic memory operation (AMO). The reference to a long AMO is an AMO that cannot complete within a single execution cycle (e.g., a clock cycle). An AMO is a near-memory operation completed by an accelerator of the memory controller.

The illustrated control and data paths are configured such that separate storage, queuing, and request prioritization enables forward progress on CM requests while executing in the presence of NI requests. Thus, CM requests will not be delayed by an NI request.

FIG. 4 illustrates an example of an associative cache 400, according to an embodiment. Here, the associative cache 400 includes four cache sets, cache set zero 405, cache set one 410, cache set two 415, and cache set three 420. Note that each cache set corresponds to a memory address range. Thus, cache set one corresponds to all memory elements with an address prefixed by 00 while cache set three 415 corresponds to all memory elements with an address prefixed by 10. The cache lines within each cache set represent a storage element (e.g., register) sized for an element in the memory. Each cache line can also be called a "way." Thus, as illustrated, the associated cache 400 is a four-way associative cache because four ways can be used for each cache set. Generally, memory requests with addresses in one cache set will load a way until all of the ways are used. With the arrival of another memory request, a process to evict a way to load the new data can be undertaken to free the way for the new memory request.

The associative cache 400 can maintain metadata for the ways. Thus, as illustrated, the associative cache 400 includes a tag (e.g., metadata) in addition to the way data, resulting in the way zero tag and data 425, the way one tag and data 430, the way two tag and data 435, and the way three tag and data 440. Examples of tag data can include a dirty bit to indicate whether the way is out-of-sync with the backing memory, whether there is an operation to synchronize the way with host memory (e.g., a host recall is underway), or CXL meta-state, request state, among others. In an example, whether the source (e.g., internal, or external) of the request impacts operation of the memory controller, the tag data can include designation of whether the request is internal or external as well as, for example, whether the request is internal and deferred, or external and deferred.

The following is an example of a data structure (e.g., C-style struct) to hold tag data that applies to an entire cache set (e.g., not specific to a single way in the cache set):

```
struct MscSet {
    bool                m_bRetryPend;
    uint32_t                    m_evHashMask;
    SimCount                    m_evRecallCnt;
    SimMscReqList               m_niDeferList;
    SimMscReqList               m_cmDeferList;
};
```

The following is an example of a data structure (e.g., C-style struct) to hold tag data for a given way in a cache set:

```
struct MscWay {
    struct MscWayTag {
        uint64_t            m_addr;
        std::bitset         m_validMask;
        std::bitset         m_dirtyMask;
        std::bitset         m_mBusyMask;
        bool                m_bRetryPend;
        bool                m_bRecallPend;
        uint16_t            m_recallRid;
        MetaState           m_memMetaState;
        MetaState           m_curMetaState;
        SimMscReqList        m_niDeferList;
        SimMscReqList        m_cmDeferList;
    } m_tag;
    uint8_t[64]  m_data;
};
```

FIG. 5 illustrates an example of a memory 500 including several cache way defer queues and cache tags 525 pointing to the defer queues, according to an embodiment. As illustrated, the memory 500 is used to implement several queues. The queues each occupy a contiguous range of the memory 500, with the specific boundaries of the queue defined by a head a tail pointer. In this example, the queue is implemented as a linked list or a double-linked list. The former enables traversal starting at the head, although enqueueing can be accomplished merely by updating the tail element with a new tail location and placing the new item at the new tail location. A double linked list enables traversal of the list from either the head or the tail.

The queues correspond to a cache way by storage of the head and tail pointers in the tag data. Thus, in the cache set 530, the way zero tag 535 maintains the head and tail pointer for the queue 505 (illustrated as holding request one). The empty entry 510 is part of the contiguous memory range corresponding to the queue 505. Thus, if a second request were enqueue, the tail pointer would be moved to the entry 510. Similarly, the way one tag 540 holds the head and tail pointer for the queue 515, and the way N tag 545 maintains the head and tail pointer for the queue 520.

An alternative configuration of the queue can leverage, if it exists, the request directory entries (e.g., as illustrated in element 330 of FIG. 3). Here, the queue is simply a head pointer into the directory to designate the first request in the queue and a tail pointer into the directory to designate the last request in the queue. The queue, in this example, is a linked-list in which the elements (e.g., directory entries for the requests) point to each other. In a simple implementation, the links are one-way from the head to the tail. Thus, the directory entry for each element in the list links to the next element in the list. To add a new element, the "next element" pointer in the directory entry indicated by the tail pointer is updated to the new entry and the tail pointer is also updated to the new entry. In an example, the linked list can be bi-directional, in which each directory entry has a pointer to a previous element as well as a next element. The queue is traversed by entering the queue using the head pointer, for example, to get to a directory entry. The next element pointer can then be used to get to the next element of the queue. This process can be repeated until the next element pointer is empty, indicating the end of the queue.

FIG. 6 illustrates an example of a cache set reference 600 to cache-set defer queues divided by which interface requests were received, according to an embodiment. Specifically, the external defer queues 630 hold requests, or identifiers of requests, for CM requests and the internal defer queues 645 hold NI requests. FIG. 6 differs from the arrangement illustrated in FIG. 5 by separating the queues between the external queues 630 and the internal queues 645. Thus, the way zero tag data includes a field 610 storing the head and pointer for external queue 635 as well as the field 615 for the head pointer of the internal queue 650.

Another difference from the arrangement illustrated in FIG. 5 includes the inclusion of the field 620 and field 625 in the cache set 605. Here, the field 620 holds a head and tail pointer for an external queue of the cache set 605 and the field 625 holds a head and tail pointer for an internal queue of the cache set 605. As described above, if a way is instantiated for an address in the request, but the way is busy, the request is deferred into the appropriate defer queue for the way. Thus, if the request A is an external request and has an address that corresponds to the current way zero, but way zero is busy, then request A is enqueued into the queue 635 for the way zero. However, if there is no way that corresponds to the address in the request, then the request is deferred at the cache set level. Accordingly, because request M is an internal request with an address that does not match any current way—and all ways are busy—the request M is deferred by being placed on the internal defer queue 655. Similarly, external request N is deferred at the cache set level in queue 640 for similarly reasons given for request M.

Figure 7:
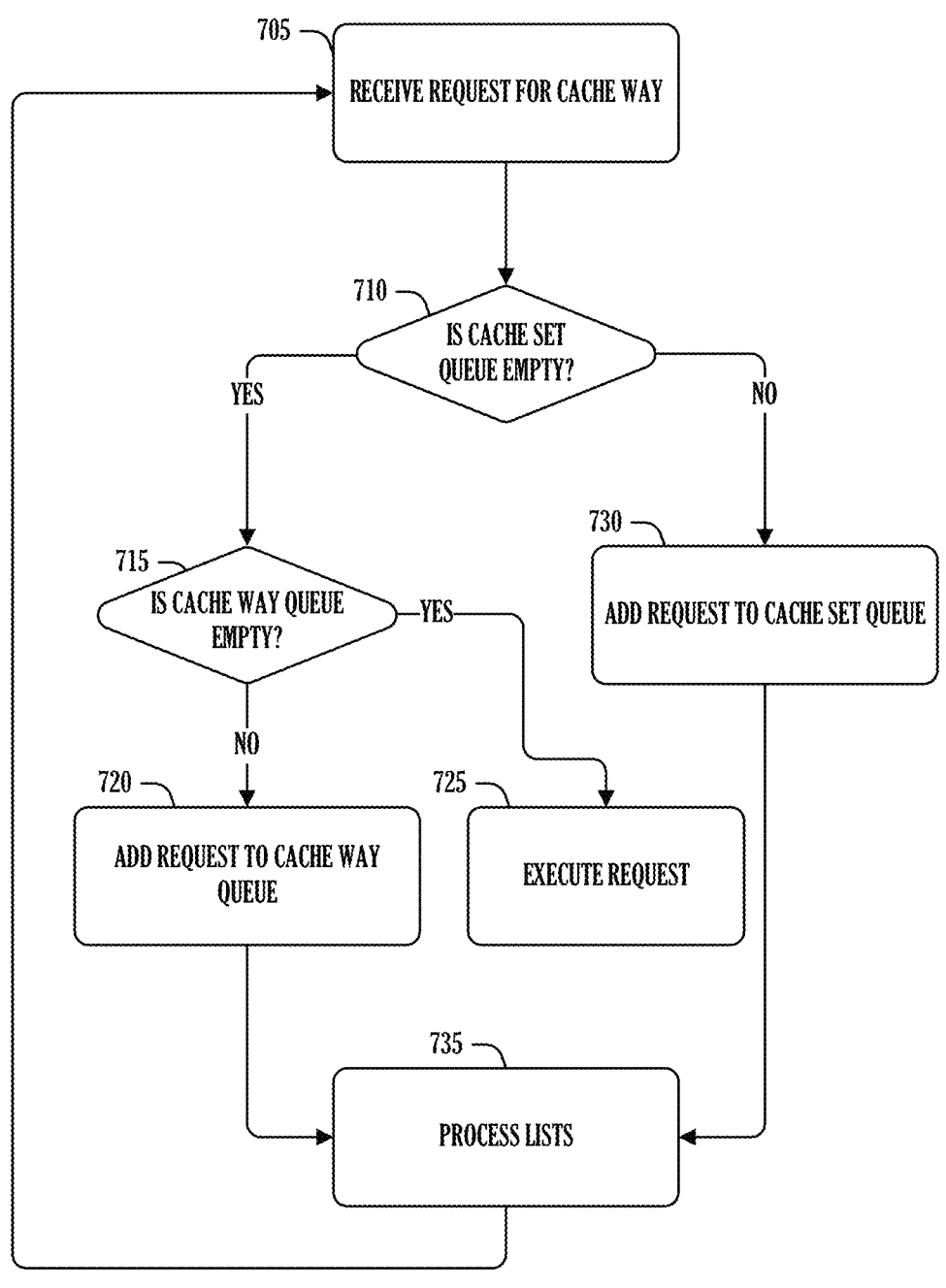
FIG. 7 illustrates an example of a processing flow to synchronize requests, according to an embodiment.

FIG. 7 illustrates an example of a processing flow to synchronize requests, according to an embodiment. In an example, the following criteria can be used to determine whether a request should be pushed onto a cache set queue (e.g., the deferred list) or onto a cache way queue (e.g., way list). As used above, CM refers to an external request that will not block on an internal, or NI, request. However, in the following scenarios, the type of request, CM or NI, does not generally matter except to which queue is being checked. Accordingly, a CM request will be affected by the state of a cache set CM queue or a cache way CM queue but not either of the corresponding NI queues.

When a request is received (operation 705) a determination is made whether the cache set queue is empty (decision 710). Which of an internal or external cache set queue that is checked depends upon the request. Thus, a CM request will result in checking the cache set CM queue.

If the cache set queue is empty (decision 710), then the appropriate cache way queue is checked to determine whether the cache way queue is empty (decision 715). In this scenario, the address in the request maps to a current way of the cache. If no current way mapped to the address, then the request would simply be placed into the cache set queue. However, where, the cache has a way that matches the request.

If the cache way queue (decision 715) is empty, and the way is not busy, then the request is executed (operation 725). If the way is busy, then the request is placed in the cache way queue. If the way is not busy, but the cache way queue is not empty (decision 715), then the way is placed in the cache way queue 720. This last scenario maintains execution order in the way even if the way is not busy because previous requests that have not had a chance to execute are in the cache way queue. Thus, the request will be enqueued to run when previous requests have been processed (operation 735).

If the cache set queue is not empty (decision 710), the request is added to the cache set queue (operation 730). This occurs whether or not the request maps to a current way of the cache and whether or not the current way of the cache is busy. This behavior addresses a situation in which a previous request was deferred into the cache set queue because, for example, the previous request mapped to an address for which there is no current way. Thus, the previous request is deferred until an opportunity to evict some current way is available and the memory line of the request can be loaded into a way. Accordingly, a new request, even one that maps to a current way, may not map to a current when it is executed in order with previously arrived requests. As long as the cache set queue has elements representing requests, new requests are enqueued into the cache set queue without regard to other circumstances. The cache set queue is then processed (operation 735) as usual to eventually execute the request.

Following the illustrated process avoids some out-of-order execution scenarios. For example, consider an NI request that is started, finds an available way within a cache set and issues a request to memory. A second NI request is received for the same memory way. The second request finds the way busy and is pushed to the cache way NI queue for that way. The first NI request memory response is received, and the first request is processed and completed marking the way tag state as no longer busy waiting for memory. A third NI request to the same memory way is received while the second request is still in the cache way Ni queue. The third NI request finds the line in the cache is non-busy. Normally the third NI request could be immediately processed. However, since there is a deferred request in the way deferred list for that line, the third request must be pushed into the way deferred list to execute after the second request.

Figure 8:
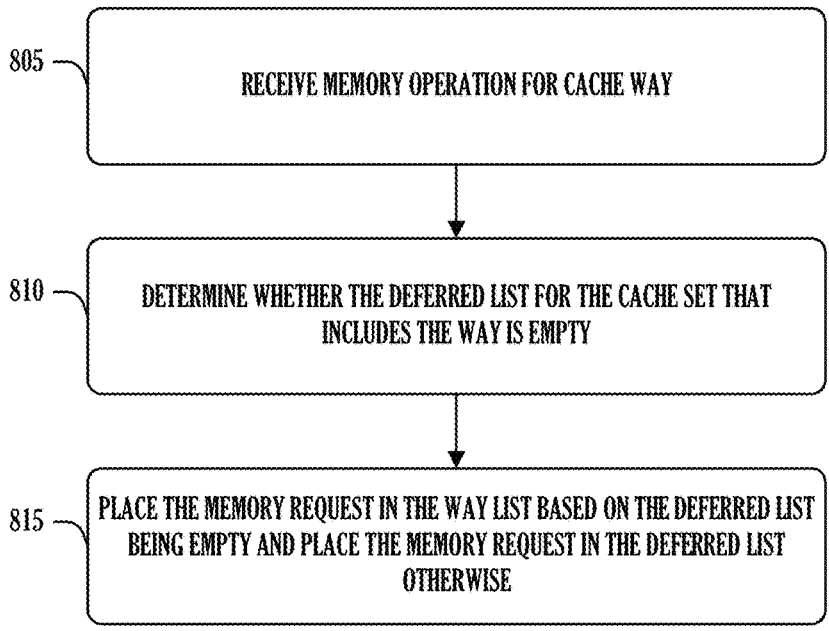
FIG. 8 illustrates a flow diagram of an example of a method for synchronized request handling at a memory device, according to an embodiment.

FIG. 8 illustrates a flow diagram of an example of a method 800 for synchronized request handling at a memory device, according to an embodiment. The operations of the method 800 are performed by computational hardware, such as that described above or below (e.g., processing circuitry).

At operation 805, a request is received at the memory device. In this example, the request indicates (e.g., includes) a memory address corresponding to a single cache line (e.g., way) in a set of cache lines. The memory device also maintains a deferred list for the set of cache lines and a set of lists where each member of the set of lists corresponds to one cache line in the set of cache lines. In an example, the deferred list is implemented as linked lists. In an example, one or members of the set of lists are implemented as linked lists.

At operation 810, the deferred list is checked to determine that the deferred list is not empty.

At operation 815, the request is placed in the deferred list.

In an example, the method 800 includes the operations of receiving a second request indicating a second memory address corresponding to the set of cache lines and a second single cache line in the set of cache lines. The deferred list is tested to determine that the deferred list is empty. In this case, in response to the determination that the deferred list is empty, a member of the set of lists that corresponds to the second single cache line to determine whether the member of the set of lists is empty. In an example, in response to the member of the set of lists not being empty, the second request is placed in the member of the set of lists.

In an example, the member of the set of lists is empty. In an example, the second single cache line is tested to determine if the second cache line is busy. In an example, testing the second cache line includes reading a tag state for the second cache line. In an example, in response to the second cache line being busy, the request is placed in the member of the set of lists. In an example, in response to the second single cache line not being busy, the request is executed.

Figure 9:
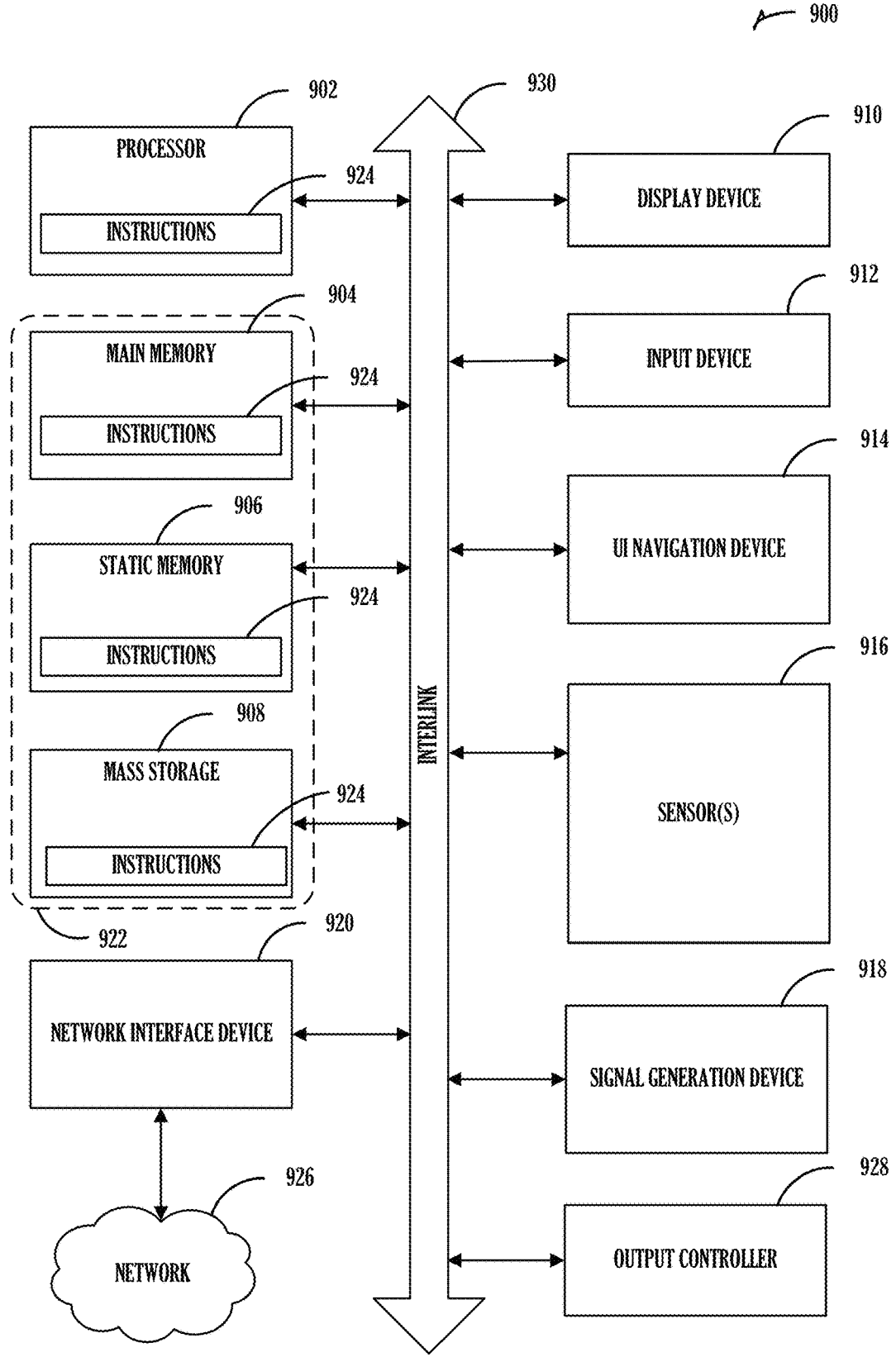
FIG. 9 illustrates an example of a machine with which one or more embodiments can be implemented.

FIG. 9 illustrates a block diagram of an example machine 900 with which any one or more of the techniques (e.g., methodologies) discussed herein can perform. Examples, as described herein, can include, or can operate by, logic or a number of components, or mechanisms in the machine 900. Circuitry (e.g., processing circuitry) is a collection of circuits implemented in tangible entities of the machine 900 that include hardware (e.g., simple circuits, gates, logic, etc.). Circuitry membership can be flexible over time. Circuitries include members that can, alone or in combination, perform specified operations when operating. In an example, hardware of the circuitry can be immutably designed to carry out a specific operation (e.g., hardwired). In an example, the hardware of the circuitry can include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components can be used in more than one member of more than one circuitry. For example, under operation, execution units can be used in a first circuit of a first circuitry at one point in time and reused by a second circuit in the first circuitry, or by a third circuit in a second circuitry at a different time. Additional examples of these components with respect to the machine 900 follow.

In alternative embodiments, the machine 900 can operate as a standalone device or can be connected (e.g., networked) to other machines. In a networked deployment, the machine 900 can operate in the capacity of a server machine, a client machine, or both in server-client network environments. In an example, the machine 900 can act as a peer machine in peer-to-peer (P2P) (or other distributed) network environment. The machine 900 can be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 900 can include a hardware processor 902 (e.g., a central processing unit (CPU), a graphics processing unit (GPU), a hardware processor core, or any combination thereof), a main memory 904, a static memory (e.g., memory or storage for firmware, microcode, a basic-input-output (BIOS), unified extensible firmware interface (UEFI), etc.) 906, and mass storage 908 (e.g., hard drives, tape drives, flash storage, or other block devices) some or all of which can communicate with each other via an interlink (e.g., bus) 930. The machine 900 can further include a display unit 910, an alphanumeric input device 912 (e.g., a keyboard), and a user interface (UI) navigation device 914 (e.g., a mouse). In an example, the display unit 910, input device 912 and UI navigation device 914 can be a touch screen display. The machine 900 can additionally include a storage device (e.g., drive unit) 908, a signal generation device 918 (e.g., a speaker), a network interface device 920, and one or more sensors 916, such as a global positioning system (GPS) sensor, compass, accelerometer, or other sensor. The machine 900 can include an output controller 928, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 902, the main memory 904, the static memory 906, or the mass storage 908 can be, or include, a machine readable medium 922 on which is stored one or more sets of data structures or instructions 924 (e.g., software) embodying or utilized by any one or more of the techniques or functions described herein. The instructions 924 can also reside, completely or at least partially, within any of registers of the processor 902, the main memory 904, the static memory 906, or the mass storage 908 during execution thereof by the machine 900. In an example, one or any combination of the hardware processor 902, the main memory 904, the static memory 906, or the mass storage 908 can constitute the machine readable media 922. While the machine readable medium 922 is illustrated as a single medium, the term "machine readable medium" can include a single medium or multiple media (e.g., a centralized or distributed database, or associated caches and servers) configured to store the one or more instructions 924.

The term "machine readable medium" can include any medium that is capable of storing, encoding, or carrying instructions for execution by the machine 900 and that cause the machine 900 to perform any one or more of the techniques of the present disclosure, or that is capable of storing, encoding or carrying data structures used by or associated with such instructions. Non-limiting machine readable medium examples can include solid-state memories, optical media, magnetic media, and signals (e.g., radio frequency signals, other photon based signals, sound signals, etc.). In an example, a non-transitory machine readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media can include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

In an example, information stored or otherwise provided on the machine readable medium 922 can be representative of the instructions 924, such as instructions 924 themselves or a format from which the instructions 924 can be derived. This format from which the instructions 924 can be derived can include source code, encoded instructions (e.g., in compressed or encrypted form), packaged instructions (e.g., split into multiple packages), or the like. The information representative of the instructions 924 in the machine readable medium 922 can be processed by processing circuitry into the instructions to implement any of the operations discussed herein. For example, deriving the instructions 924 from the information (e.g., processing by the processing circuitry) can include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions 924.

In an example, the derivation of the instructions 924 can include assembly, compilation, or interpretation of the information (e.g., by the processing circuitry) to create the instructions 924 from some intermediate or preprocessed format provided by the machine readable medium 922. The information, when provided in multiple parts, can be combined, unpacked, and modified to create the instructions 924. For example, the information can be in multiple compressed source code packages (or object code, or binary executable code, etc.) on one or several remote servers. The source code packages can be encrypted when in transit over a network and decrypted, uncompressed, assembled (e.g., linked) if necessary, and compiled or interpreted (e.g., into a library, stand-alone executable etc.) at a local machine, and executed by the local machine.

The instructions 924 can be further transmitted or received over a communications network 926 using a transmission medium via the network interface device 920 utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), LoRa/LoRaWAN, or satellite communication networks, mobile telephone networks (e.g., cellular networks such as those complying with 3G, 4G LTE/LTE-A, or 5G standards), Plain Old Telephone (POTS) networks, and wireless data networks (e.g., Institute of Electrical and Electronics Engineers (IEEE) 802.11 family of standards known as Wi-Fi®, IEEE 802.15.4 family of standards, peer-to-peer (P2P) networks, among others. In an example, the network interface device 920 can include one or more physical jacks (e.g., Ethernet, coaxial, or phone jacks) or one or more antennas to connect to the communications network 926. In an example, the network interface device 920 can include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 900, and includes digital or analog communications signals or other intangible medium to facilitate communication of such software. A transmission medium is a machine readable medium.

ADDITIONAL NOTES & EXAMPLES

Example 1 is an apparatus for synchronized request handling at a memory device, the apparatus comprising: a set of cache lines; an interface to receive a request a request that indicates a memory address corresponding to the set of cache lines, the memory address corresponding to a single cache line in the set of cache lines, the apparatus maintaining a deferred list for the set of cache lines and a set of lists, each member of the set of lists corresponding to one cache line in the set of cache lines; and processing circuitry configured to: test the deferred list to determine that the deferred list is not empty; and place the request in the deferred list.

In Example 2, the subject matter of Example 1, wherein the processing circuitry is configured to: receive, via the interface, a second request indicating a second memory address corresponding to the set of cache lines and a second single cache line in the set of cache lines; test the deferred list to determine that the deferred list is empty; and test, in response to the determination that the deferred list is empty, a member of the set of lists that corresponds to the second single cache line to determine whether the member of the set of lists is empty.

In Example 3, the subject matter of Example 2, wherein the processing circuitry is configured to place, in response to the member of the set of lists not being empty, the second request in the member of the set of lists.

In Example 4, the subject matter of any of Examples 2-3, wherein the member of the set of lists is empty.

In Example 5, the subject matter of Example 4, wherein the processing circuitry is configured to test the second single cache line to determine if the second single cache line is busy.

In Example 6, the subject matter of Example 5, wherein, to test the second single cache line, the processing circuitry is configured to read a tag state for the second single cache line.

In Example 7, the subject matter of Example 6, wherein the processing circuitry is configured to place, in response to the second single cache line being busy, the request in the member of the set of lists.

In Example 8, the subject matter of any of Examples 6-7, wherein the processing circuitry is configured to execute, in response to the second single cache line not being busy, the request.

In Example 9, the subject matter of any of Examples 1-8, wherein the deferred list and each member of the set of lists are implemented as linked lists.

Example 10 is a method for synchronized request handling at a memory device, the method comprising: receiving a request at the memory device, the request indicating a memory address corresponding to a set of cache lines, the memory address corresponding to a single cache line in the set of cache lines, the memory device maintaining a deferred list for the set of cache lines and a set of lists, each member of the set of lists corresponding to one cache line in the set of cache lines; testing the deferred list to determine that the deferred list is not empty; and placing the request in the deferred list.

In Example 11, the subject matter of Example 10, comprising: receiving a second request indicating a second memory address corresponding to the set of cache lines and a second single cache line in the set of cache lines; testing the deferred list to determine that the deferred list is empty; and testing, in response to the determination that the deferred list is empty, a member of the set of lists that corresponds to the second single cache line to determine whether the member of the set of lists is empty.

In Example 12, the subject matter of Example 11, comprising placing, in response to the member of the set of lists not being empty, the second request in the member of the set of lists.

In Example 13, the subject matter of any of Examples 11-12, wherein the member of the set of lists is empty.

In Example 14, the subject matter of Example 13, comprising testing the second single cache line to determine if the second single cache line is busy.

In Example 15, the subject matter of Example 14, wherein testing the second single cache line includes reading a tag state for the second single cache line.

In Example 16, the subject matter of Example 15, comprising placing, in response to the second single cache line being busy, the request in the member of the set of lists.

In Example 17, the subject matter of any of Examples 15-16, comprising executing, in response to the second single cache line not being busy, the request.

In Example 18, the subject matter of any of Examples 10-17, wherein the deferred list and each member of the set of lists are implemented as linked lists.

Example 19 is a machine readable medium including instructions for synchronized request handling at a memory device, the instructions, when executed by processing circuitry, cause the processing circuitry to perform operations comprising: receiving a request at the memory device, the request indicating a memory address corresponding to a set of cache lines, the memory address corresponding to a single cache line in the set of cache lines, the memory device maintaining a deferred list for the set of cache lines and a set of lists, each member of the set of lists corresponding to one cache line in the set of cache lines; testing the deferred list to determine that the deferred list is not empty; and placing the request in the deferred list.

In Example 20, the subject matter of Example 19, wherein the operations comprise: receiving a second request indicating a second memory address corresponding to the set of cache lines and a second single cache line in the set of cache lines; testing the deferred list to determine that the deferred list is empty; and testing, in response to the determination that the deferred list is empty, a member of the set of lists that corresponds to the second single cache line to determine whether the member of the set of lists is empty.

In Example 21, the subject matter of Example 20, wherein the operations comprise placing, in response to the member of the set of lists not being empty, the second request in the member of the set of lists.

In Example 22, the subject matter of any of Examples 20-21, wherein the member of the set of lists is empty.

In Example 23, the subject matter of Example 22, wherein the operations comprise testing the second single cache line to determine if the second single cache line is busy.

In Example 24, the subject matter of Example 23, wherein testing the second single cache line includes reading a tag state for the second single cache line.

In Example 25, the subject matter of Example 24, wherein the operations comprise placing, in response to the second single cache line being busy, the request in the member of the set of lists.

In Example 26, the subject matter of any of Examples 24-25, wherein the operations comprise executing, in response to the second single cache line not being busy, the request.

In Example 27, the subject matter of any of Examples 19-26, wherein the deferred list and each member of the set of lists are implemented as linked lists.

Example 28 is a system for synchronized request handling at a memory device, the system comprising: means for receiving a request at the memory device, the request indicating a memory address corresponding to a set of cache lines, the memory address corresponding to a single cache line in the set of cache lines, the memory device maintaining a deferred list for the set of cache lines and a set of lists, each member of the set of lists corresponding to one cache line in the set of cache lines; means for testing the deferred list to determine that the deferred list is not empty; and means for placing the request in the deferred list.

In Example 29, the subject matter of Example 28, comprising: means for receiving a second request indicating a second memory address corresponding to the set of cache lines and a second single cache line in the set of cache lines; means for testing the deferred list to determine that the deferred list is empty; and means for testing, in response to the determination that the deferred list is empty, a member of the set of lists that corresponds to the second single cache line to determine whether the member of the set of lists is empty.

In Example 30, the subject matter of Example 29, comprising means for placing, in response to the member of the set of lists not being empty, the second request in the member of the set of lists.

In Example 31, the subject matter of any of Examples 29-30, wherein the member of the set of lists is empty.

In Example 32, the subject matter of Example 31, comprising means for testing the second single cache line to determine if the second single cache line is busy.

In Example 33, the subject matter of Example 32, wherein the means for testing the second single cache line include means for reading a tag state for the second single cache line.

In Example 34, the subject matter of Example 33, comprising means for placing, in response to the second single cache line being busy, the request in the member of the set of lists.

In Example 35, the subject matter of any of Examples 33-34, comprising means for executing, in response to the second single cache line not being busy, the request.

In Example 36, the subject matter of any of Examples 28-35, wherein the deferred list and each member of the set of lists are implemented as linked lists.

Example 37 is at least one machine-readable medium including instructions that, when executed by processing circuitry, cause the processing circuitry to perform operations to implement of any of Examples 1-36.

Example 38 is an apparatus comprising means to implement of any of Examples 1-36.

Example 39 is a system to implement of any of Examples 1-36.

Example 40 is a method to implement of any of Examples 1-36.

The above detailed description includes references to the accompanying drawings, which form a part of the detailed description. The drawings show, by way of illustration, specific embodiments that can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) can be used in combination with each other. Other embodiments can be used, such as by one of ordinary skill in the art upon reviewing the above description. The Abstract is to enable the reader to quickly ascertain the nature of the technical disclosure and is submitted with the understanding that it will not be used to interpret or limit the scope or meaning of the claims. Also, in the above Detailed Description, various features can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

The invention claimed is:

1. A cache device comprising:
a first interface configured to receive a memory requests;
a second interface configured to communicate with a memory device;
a storage device with a portion configured as a set of cache lines including a cache line; and
processing circuitry configured to:
maintain a tag state for the cache line;
maintain a set of lists for the set of cache lines including a list for the cache line;
maintain a deferred list for the set of cache lines;
receive, via the first interface, a memory request for the cache line; and handle the memory request based on a sequence of determining if the deferred list is empty, if the list for the cache line is empty, or the tag state indicates that the cache line is busy.

2. The cache device of claim 1, wherein the memory device and the cache device are packaged together.

3. The cache device of claim 2, comprising a third interface to a second memory device.

4. The cache device of claim 3, wherein the memory device is a random access memory (RAM) device, and wherein the second memory device includes an array of non-volatile memory cells.

5. The cache device of claim 1, wherein the memory device and the cache device are not packaged together.

6. The cache device of claim 1, wherein the first interface implements a Compute Express Link (CXL) family of standards.

7. The cache device of claim 6, wherein the memory request originates from a host device.

8. The cache device of claim 1, wherein the processing circuitry is configured to:

receive, via the first interface, a second memory request for a second cache line in the set of cache lines;

measure the deferred list to determine that the deferred list is empty; and measure, in response to determining that the deferred list is empty, a member of the set of lists that corresponds to the second cache line to determine whether the member of the set of lists is empty.

9. The cache device of claim 8, wherein the processing circuitry is configured to place, in response to the member of the set of lists not being empty, the second memory request in the member of the set of lists.

10. The cache device of claim 8, wherein the member of the set of lists is empty.

11. The cache device of claim 10, wherein the processing circuitry is configured to test the second cache line to determine if the second cache line is busy.

12. The cache device of claim 11, wherein, to test the second cache line, the processing circuitry is configured to read a tag state for the second cache line.

13. The cache device of claim 12, wherein the processing circuitry is configured to place, in response to the second cache line being busy, the memory request in the member of the set of lists.

14. The cache device of claim 12, wherein the processing circuitry is configured to execute, in response to the second cache line not being busy, the memory request via the second interface.

15. The cache device of claim 1, wherein the deferred list and each member of the set of lists are implemented as linked lists.

16. The cache device of claim 1, wherein the memory request is a read.

17. The cache device of claim 1, wherein the memory request is a write.

18. The cache device of claim 1, comprising an accelerator configured to perform near memory operations.

19. The cache device of claim 18, wherein the accelerator is atomic processing circuitry.

20. The cache device of claim 18, wherein the memory request indicates execution of an operation by the accelerator.

\* \* \* \* \*